Patented Feb. 14, 1939

2,147,000

UNITED STATES PATENT OFFICE 2,147,000

PRODUCTION OF NEW TANNING AGENTS

Edmund Stiasny, Helsinborg, Sweden, assignor to I. G. Farbenindustrie Aktiengesellschaft, Frankfort-on-the-Main, Germany No Drawing. Application November 13, 1936, Serial No. 110,681. In Germany November 23, 1935

7 Claims. (Cl. 149—5)

The present invention relates to new tanning agents and a process of producing same.

I have found that substances having a strong tanning action are obtained by treating the reaction products of acetone and formaldehyde (giving methylolacetone) or ammonia (giving di- and triacetonamine) or organic compounds which contain at least one NH-group, as for example urea (giving triacetone di-urea), with sulphonic acids of aromatic hydrocarbons or their hydroxy-derivatives or other substitution products and formaldehyde. Suitable sulphonic acids are, for example, those of naphthalene, methylnaphthalene, anthracene, phenanthrene, phenol, cresol, naphthol and the like. The said condensation products of acetone may be prepared in any desired manner. Presumably they do not enter into the molecule of the sulphonic acids employed as initial materials, in the form of their components, but as a whole, imparting to the tanning agents obtained particularly advantageous properties, concerning, for example, color, solubility and appearance as well as the precipitation power for gelatine etc. Instead of starting from the ready-made condensation products of acetone, it is possible also to employ the corresponding components in the necessary quantitative proportions and under conditions which effect the formation of these condensation products.

The initial materials may be caused to react with one another in any desired sequence as well as simultaneously. The amounts employed and the temperatures required for their conversion vary according to the kind of the initial substances and the desired properties of the final products.

In some cases it is advantageous to give the reaction mixture an addition of aromatic carboxylic acids containing hydroxyl groups, as for example salicylic acid. The products obtained may, if not or only insufficiently soluble in water, be rendered soluble in water by a treatment with sulphonating agents, as for example by sulphonation with concentrated sulphuric acid, oleum or chlorosulphonic acid. An aftertreatment with one of the above-named aromatic sulphonic acids, with or without a subsequent treatment with formaldehyde, may also lead to products of improved solubility.

The following examples will further illustrate how this invention is carried out in practice, but the invention is not restricted to these examples. The parts are by weight.

Example 1

30 parts of cresol sulphonic acid are heated at 50° to 60° C. with 10 parts of water and 8 parts of triacetone di-urea, while thoroughly mixing until a homogeneous tough mass is formed. After cooling to about 30° C. 6 parts of 36 per cent formaldehyde are slowly added. Then heating is continued at between 50° and 60° C. for a quarter of an hour. After the product obtained has been allowed to cool, it is adjusted while cooling to the desired degree of acidity; it can then be directly used for the tanning of animal hides.

Example 2

40 parts of cresol sulphonic acid are thoroughly mixed with 10 parts of water, 10 parts of triacetone di-urea and 6 parts of salicylic acid, whereupon 12 parts of 30 per cent formaldehyde are added. The mass is then heated at about 70° C. for half an hour and adjusted, after cooling, to the desired degree of acidity.

Example 3

14 parts of a melt of naphthalene sulphonic acid are thoroughly mixed with 17 parts of water, 10 parts of triacetone di-urea and 10 parts of 30 per cent formaldehyde. This mass which is insoluble in water is heated to from 70° to 80° C. with a solution of 40 parts of anthracene sulphonic acid in 10 parts of water, until solubility in water occurs. The product thus formed can be used for tanning either directly or after condensation with 10 parts of 30 per cent formaldehyde.

Example 4

7 parts of a melt of naphthalene sulphonic acid are thoroughly mixed for a quarter of an hour with 4 parts of water, 30 parts of cresol sulphonic acid and 15 parts of triacetone di-urea and then 20 parts of 30 per cent formaldehyde are added while cooling. The product is then adjusted to the desired degree of acidity.

Example 5

10 parts of acetone are mixed with 50 parts of 30 per cent formaldehyde and 2 parts of 10 per cent caustic soda solution; the mixture is allowed to stand for some time and heated at about 80° C. for 1 hour with a solution of the sodium salt of cresol sulphonic acid (from 20 parts of cresol sulphonic acid) in a little water. Then 12 parts of cresol sulphonic acid and, after a short time, 8 parts of 30 per cent formaldehyde are added, heating being continued for half an hour. The product obtained can be used for tanning after neutralization to the desired degree.

Example 6

20 parts of reaction product (mainly di- and triacetonamine) obtained from ammonia and acetone are thoroughly mixed with 40 parts of cresol sulphonic acid, whereupon after cooling, 12 parts of 30 per cent formaldehyde and then 20 parts of concentrated sulphuric acid are added and the whole is heated to 80° C. The yellow-brown cake which separates is dissolved with hot water and the amount of alkali required for the neutralization.

*Example 7*

30 parts of cresol sulphonic acid are mixed with 9 parts of acetone and 17 parts of 30 per cent formaldehyde are slowly added, while cooling. After several hours' standing the product is adjusted to the desired degree of acidity.

What I claim is:—

1. The process for the production of tanning agents which comprises treating a reaction product of acetone and a substance selected from the group consisting of formaldehyde, ammonia and organic compounds containing at least one NH-group in the molecule, with a substance selected from the group consisting of sulphonic acids of aromatic hydrocarbons, hydroxy derivatives and other substitution products of said sulphonic acids, and formaldehyde.

2. The process for the production of tanning agents which comprises treating a reaction product of acetone and a substance selected from the group consisting of formaldehyde, ammonia and organic compounds containing at least one NH-group in the molecule, with a substance selected from the group consisting of sulphonic acids of aromatic hydrocarbons, hydroxy derivatives and other substitution products of said sulphonic acids, and formaldehyde while adding an aromatic carboxylic acid containing at least one hydroxy group at any time.

3. The process for the production of tanning agents which comprises treating a reaction product of acetone and a substance selected from the group consisting of formaldehyde, ammonia and organic compounds containing at least one NH-group in the molecule, with a substance selected from the group consisting of sulphonic acids of aromatic hydrocarbons, hydroxy derivatives and other substitution products of said sulphonic acids, and formaldehyde and acting on the product obtained with a sulphonating agent.

4. The process for the production of tanning agents which comprises treating a reaction product of acetone and a substance selected from the group consisting of formaldehyde, ammonia and organic compounds containing at least one NH-group in the molecule, with a substance selected from the group consisting of sulphonic acids of aromatic hydrocarbons, hydroxy derivatives and other substitution products of said sulphonic acids, and formaldehyde and acting on the product obtained with a sulphonating agent and formaldehyde.

5. The process for the production of tanning agents which comprises reacting a mixture of acetone and a substance selected from the group consisting of formaldehyde, ammonia and organic compounds containing at least 1 NH-group in the molecule under conditions causing reaction between the acetone and the said substance, with a substance selected from the group consisting of sulphonic acids of aromatic hydrocarbons, hydroxy derivatives and other substitution products of said sulphonic acids, and formaldehyde.

6. Tanning agents comprising a reaction product of (a) the product of the interaction of acetone and a substance selected from the group consisting of formaldehyde, ammonia and organic compounds containing at least 1 NH-group in the molecule, (b) a substance selected from the group consisting of sulphonic acids of aromatic hydrocarbons, hydroxy derivatives and other substitution products of said sulphonic acids, and (c) formaldehyde.

7. Tanning agents comprising a reaction product of (a) the product of the interaction of acetone and a substance selected from the group consisting of formaldehyde, ammonia and organic compounds containing at least 1 NH-group in the molecule, (b) a substance selected from the group consisting of sulphonic acids of aromatic hydrocarbons, hydroxy derivatives and other substitution products of said sulphonic acids, (c) formaldehyde and (d) an aromatic carboxylic acid containing at least 1 hydroxy group.

EDMUND STIASNY.